US012615642B2

(12) United States Patent
Lu

(10) Patent No.: US 12,615,642 B2
(45) Date of Patent: Apr. 28, 2026

(54) COMMUNICATION METHOD AND COMMUNICATION APPARATUS

(71) Applicant: GUANGDONG OPPO MOBILE TELECOMMUNICATIONS CORP., LTD., Dongguan (CN)

(72) Inventor: Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 341 days.

(21) Appl. No.: 17/582,472

(22) Filed: Jan. 24, 2022

(65) Prior Publication Data

US 2022/0150951 A1     May 12, 2022

Related U.S. Application Data

(63) Continuation of application No. PCT/CN2019/099683, filed on Aug. 7, 2019.

(51) Int. Cl.
*H04W 72/23* (2023.01)
*H04W 72/52* (2023.01)

(52) U.S. Cl.
CPC ........... *H04W 72/23* (2023.01); *H04W 72/52* (2023.01)

(58) Field of Classification Search
CPC .............................. H04W 72/23; H04W 72/52
USPC ......................................................... 370/329
See application file for complete search history.

(56) References Cited

U.S. PATENT DOCUMENTS

| | | | | |
|---|---|---|---|---|
| 11,672,021 B2 * | 6/2023 | Loehr | ................... | H04W 72/21 |
| | | | | 370/329 |
| 2015/0282213 A1 * | 10/2015 | Sun | ................... | H04W 74/0833 |
| | | | | 370/329 |
| 2018/0199225 A1 * | 7/2018 | Kim | ....................... | H04W 88/06 |
| 2019/0223048 A1 * | 7/2019 | Xu | ....................... | H04W 72/569 |
| 2019/0254114 A1 * | 8/2019 | Son | ......................... | H04L 5/001 |

FOREIGN PATENT DOCUMENTS

| | | | | |
|---|---|---|---|---|
| CN | 103248598 A | * | 8/2013 | ......... H04L 27/2656 |
| CN | 103874049 A | | 6/2014 | |
| CN | 104168214 A | | 11/2014 | |
| CN | 108768596 A | | 11/2018 | |
| CN | 109392061 A | | 2/2019 | |
| CN | 109479302 A | | 3/2019 | |
| CN | 109586854 A | | 4/2019 | |

(Continued)

OTHER PUBLICATIONS 62716281P (Year: 2018).*

(Continued)

*Primary Examiner* — Intekhaab A Siddiquee
(74) *Attorney, Agent, or Firm* — BAYES PLLC

(57) ABSTRACT

The present application provides a communication method, including: acquiring first data; in response to the first data being not met a transmission condition, determining not to delete the first data within a preset period. For example, the first data is stored in a first HARQ process. After determining that the first data does not meet the transmission condition, the terminal device can start or restart a configured grant timer of the first HARQ process. During the running of the configured grant timer, data in the first HARQ process cannot be deleted.

11 Claims, 5 Drawing Sheets

700

Determine a first transmission resource, and the first transmission resource is used for transmitting first data — S710

Generate the first data — S720

Determine a second transmission resource, where the second transmission resource is used for transmitting second data, the first data and the second data correspond to a same HARQ process, the first transmission resource overlaps with the second transmission resource — S730

Determine not to generate the second data and/or grant information of the second data — S740

(56)　　　　　References Cited

FOREIGN PATENT DOCUMENTS

| CN | 109983801 A | 7/2019 |
| WO | 2016/122162 A1 | 8/2016 |
| WO | 2016/126027 A1 | 8/2016 |

OTHER PUBLICATIONS

Second Office Action issued in corresponding Chinese application No. 202210009354.7, mailed May 31, 2023.
Second Office Action issued in corresponding European application No. 19940217.3, mailed Jul. 14, 2023.
Notice of Allowance issued in corresponding Chinese application No. 202210009354.7, mailed Aug. 11, 2023.
First Office Action issued in corresponding Chinese Application No. 202210009354.7, mailed Mar. 3, 2023.
Extended European Search Report issued in corresponding European Application No. 19940217.3, mailed May 27, 2022.
First Office Action issued in corresponding Indian Application No. 202227003965, mailed Jul. 8, 2022.
"Discussion on resource allocation of mode 1 configured grant for NR V2X", R2-1907654, Source: LG Electronics, 3GPP TSG-RAN WG2 Meeting #106, Reno, USA, May 13-May 17, 2019.
International Search Report issued in corresponding International Application No. PCT/CN2019/099683, mailed Apr. 23, 2020, 30 pages.
Written Opinion of the International Searching Authority issued in corresponding International Application No. PCT/CN2019/099683, mailed Apr. 23, 2020, 10 pages.
"3rd Generation Partnership Project; Technical Specification Group Radio Access Network; NR; Medium Access Control (MAC) protocol specification (Release 16)", 3GPP TS 38.321 V16.5.0 (Jun. 2021), 156 pages.
Third Office Action issued in corresponding European application No. 19940217.3, mailed Oct. 20, 2023.
Fourth Office Action issued in corresponding European application No. 19940217.3, mailed Mar. 11, 2024.
Communication Under Rule 71(3) EPC issued in corresponding European Application No. 19940217.3, dated Aug. 27, 2024, 50 pages.
Hearing Notice issued in corresponding India Application No. 202227003965, mailed on Oct. 17, 2024, 2 pages.

* cited by examiner

Terminal Device 120

Network Device 110

200

| Acquire first data | — S210 |

| In response to the first data being not met a transmission condition, the first data is determined not to be deleted within a preset period | — S220 |

300

| Acquire first data | — S310 |

| Determine a processing mode of the first data according to data volume that the first transmission resource can bear | — S320 |

400
Determine a detection mode of first data according to a data volume that a
first transmission resource can bear, and the first transmission resource is
used for transmitting the first data          — S410
FIG. 4
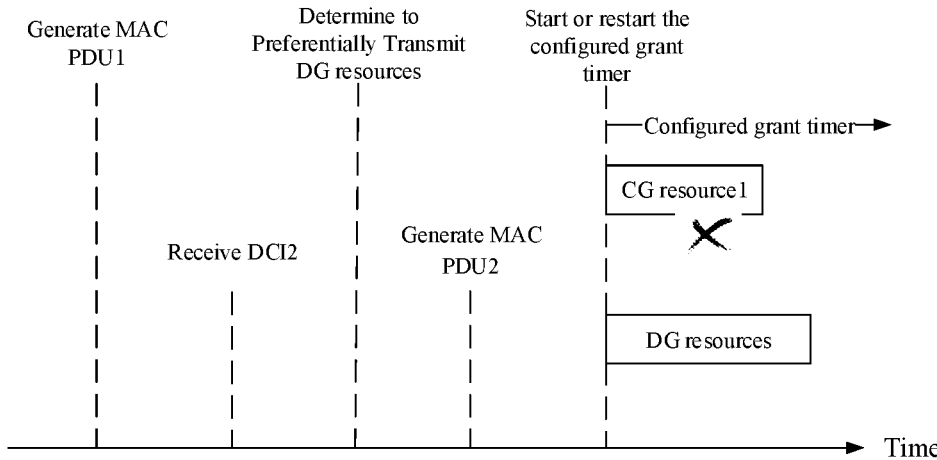
FIG. 5
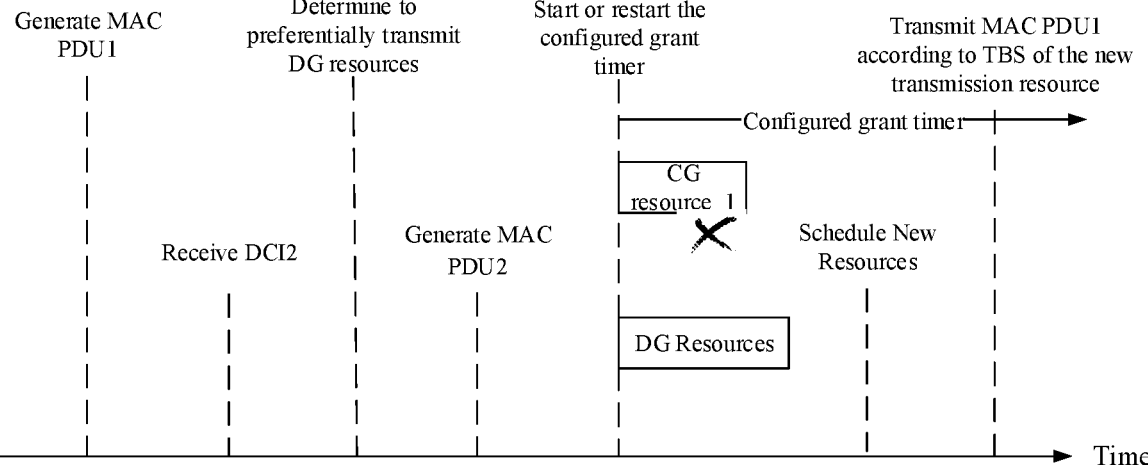
FIG. 6

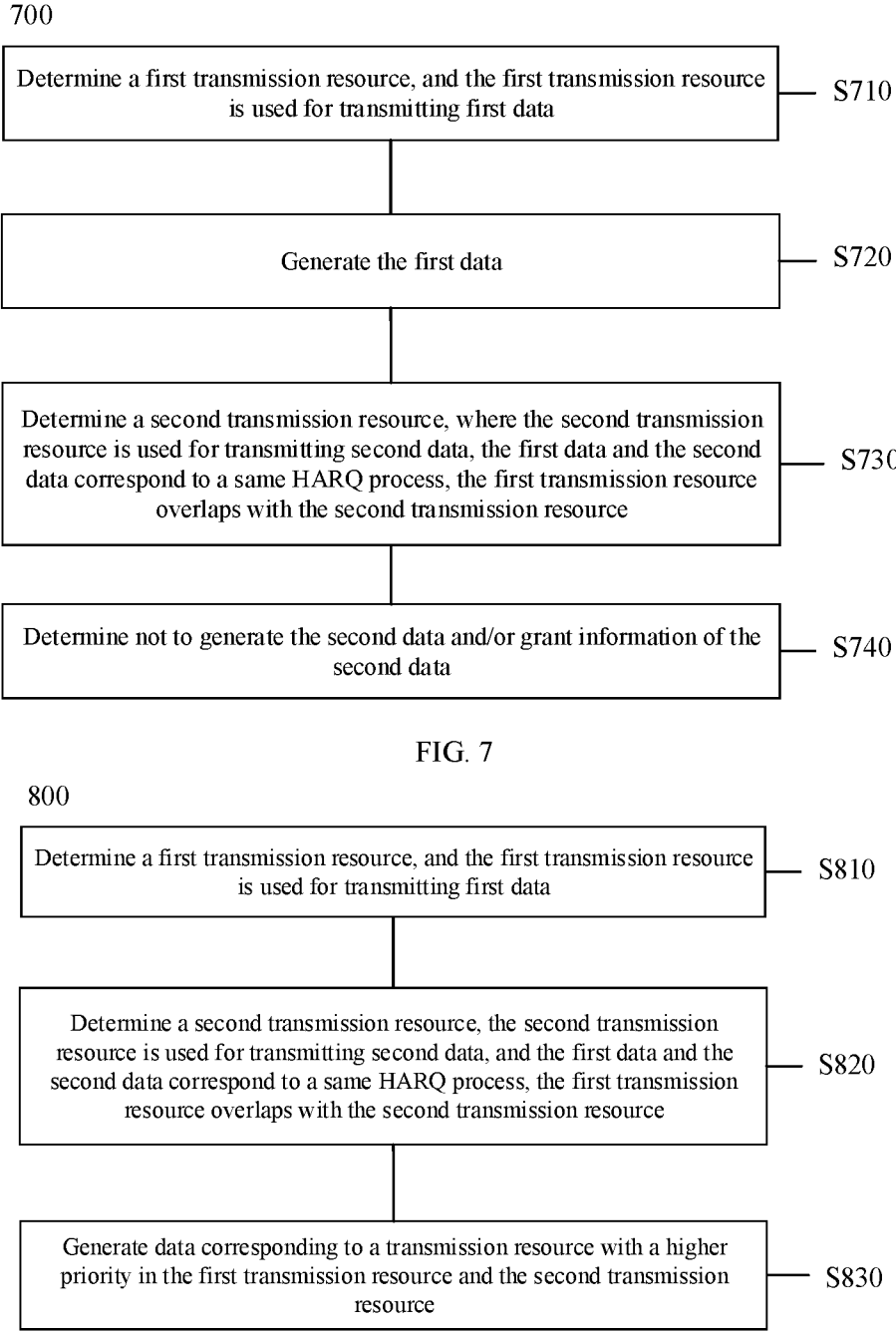

700

Determine a first transmission resource, and the first transmission resource is used for transmitting first data — S710

Generate the first data — S720

Determine a second transmission resource, where the second transmission resource is used for transmitting second data, the first data and the second data correspond to a same HARQ process, the first transmission resource overlaps with the second transmission resource — S730

Determine not to generate the second data and/or grant information of the second data — S740

Determine a first transmission resource, and the first transmission resource is used for transmitting first data — S810

Determine a second transmission resource, the second transmission resource is used for transmitting second data, and the first data and the second data correspond to a same HARQ process, the first transmission resource overlaps with the second transmission resource — S820

Generate data corresponding to a transmission resource with a higher priority in the first transmission resource and the second transmission resource — S830

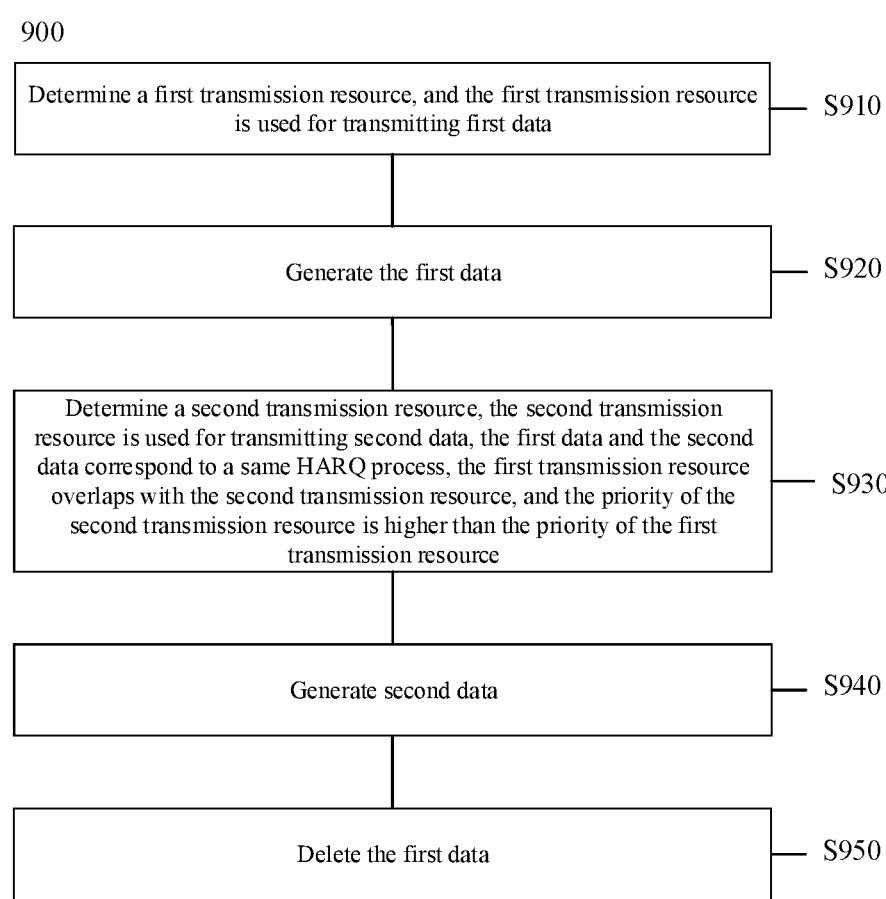

Determine a first transmission resource, and the first transmission resource is used for transmitting first data — S910

Generate the first data — S920

Determine a second transmission resource, the second transmission resource is used for transmitting second data, the first data and the second data correspond to a same HARQ process, the first transmission resource overlaps with the second transmission resource, and the priority of the second transmission resource is higher than the priority of the first transmission resource — S930

Generate second data — S940

Delete the first data — S950

FIG. 9

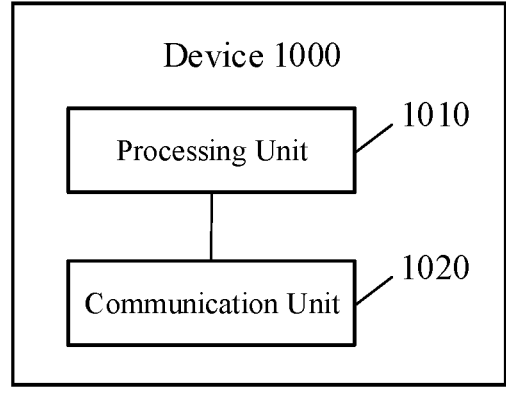

Device 1000

Processing Unit  — 1010

Communication Unit — 1020

FIG. 10

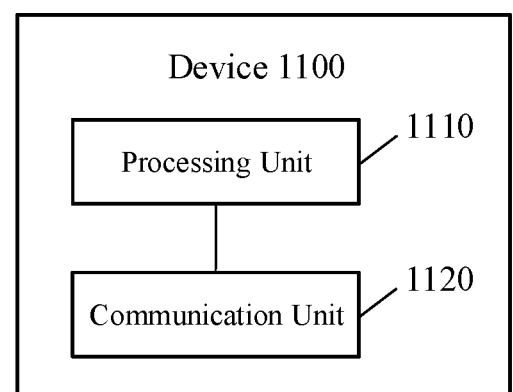

Device 1100

Processing Unit — 1110

Communication Unit — 1120

FIG. 11

COMMUNICATION METHOD AND COMMUNICATION APPARATUS

CROSS-REFERENCE TO RELATED APPLICATIONS

This application is a continuation of International Application No. PCT/CN2019/099683 filed on Aug. 7, 2019, entitled "COMMUNICATION METHOD AND COMMUNICATION APPARATUS," the contents of which are incorporated herein by reference in its entirety.

TECHNICAL FIELD

The present application relates to the field of communications, and in particular to a communication method and communication device.

BACKGROUND

The 5th generation (5G) communication system supports protocol data unit (PDU) connection services. The PDU connection service is a service of transmitting PDUs between a terminal device and a network device. PDU is an information unit transmitted between peer entities in the network, and can include control information and service data.

For example, the control information contained in the PDU of the media access control (MAC) layer can be referred to as a MAC control element (CE), and the service data contained in the PDU of the MAC layer can be referred to as a MAC service data unit (SDU).

The industrial internet of things (IIoT) is an application scenario of 5G communication systems, which has extremely high requirements for latency and transmission reliability.

SUMMARY

The present application provides a communication method and a communication device.

A first aspect provides a communication method, including: acquiring first data; and determining a processing mode of the first data according to data bearing capacity of the first transmission resource, and the first transmission resource is a configured grant resource.

In a second aspect, a terminal device is provided, including a processor and a memory. The memory is used to store a computer program, and the processor is used to call and run the computer program stored in the memory to execute the method in the first aspect.

In a third aspect, a network device is provided, including a processor and a memory. The memory is used to store a computer program, and the processor is used to call and run the computer program stored in the memory to execute determine a detection mode of first data according to data bearing capacity of first transmission resource, the first transmission resource is used for transmitting the first data, and the first transmission resource is a configured grant (CG) resource.

In a fourth aspect, a chip is provided for executing the above-mentioned method. Specifically, the chip includes: a processor, which is used to call and run a computer program from the memory, so that the device installed with the chip is used to execute the method described above.

In a fifth aspect, a non-transient computer-readable storage medium is provided for storing a computer program that enables a computer to execute the method stated above.

BRIEF DESCRIPTION OF THE DRAWINGS

FIG. 4 is a schematic diagram illustrating yet another communication method provided by the present application;

FIG. 5 is a schematic diagram illustrating yet another communication method provided by the present application:

FIG. 6 is a schematic diagram illustrating yet another communication method provided by the present application:

FIG. 7 is a schematic diagram illustrating yet another communication method provided by the present application:

FIG. 8 is a schematic diagram illustrating yet another communication method provided by the present application:

FIG. 9 is a schematic diagram illustrating yet another communication method provided by the present application:

FIG. 10 is a schematic diagram illustrating a communication device provided by the present application:

FIG. 11 is a schematic diagram illustrating another communication device provided by the present application:

DETAILED DESCRIPTION

The technical solutions of the embodiments of the present application will be described below with reference to the accompanying drawings in the embodiments of the present application. Apparently, only a part of the embodiments, not all the embodiments of the present application, are described.

All other embodiments obtained, based on the embodiments described in the present application, by those skilled in the art without paying creative efforts shall fall within the protection scope of the present application.

Figure 1:
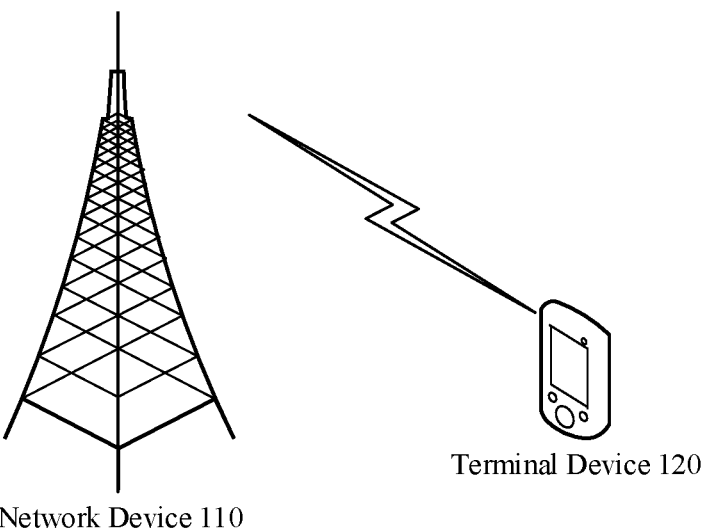
FIG. 1 is a schematic diagram illustrating a communication system to which the present application is applied.

First, an application scenario of the present application is introduced. FIG. 1 is a schematic diagram illustrating a communication system to which the present application is applied.

The communication system 100 includes a network device 110 and a terminal device 120. The terminal device 120 communicates with the network device 110 through electromagnetic waves.

In the present application, the terminal device 120 may include various handheld devices with wireless communication functions, vehicle-mounted devices, wearable devices, computing devices, or other processing devices connected to a wireless modem, such as user equipment (UE), mobile station (MS), soft terminal, home gateway, set-top box and the like defined in the third generation partnership project (3GPP).

The network device 110 may be a base station defined by 3GPP, for example, a base station (gNB) in a 5G communication system. The network device 110 may also be a non-3GPP access network device, such as an access gateway (AGF). The network device 110 may also be a relay station, an access point, a vehicle-mounted device, a wearable device, and other types of devices.

The communication system 100 is only described as an example, and the communication system to which the present application is applied is not limited to this.

For example, the number of network devices and terminal devices included in the communication system 100 may not be limited to one. For the sake of brevity, the terminal device and network device hereinafter are no longer accompanied by the reference numeral.

Figure 2:
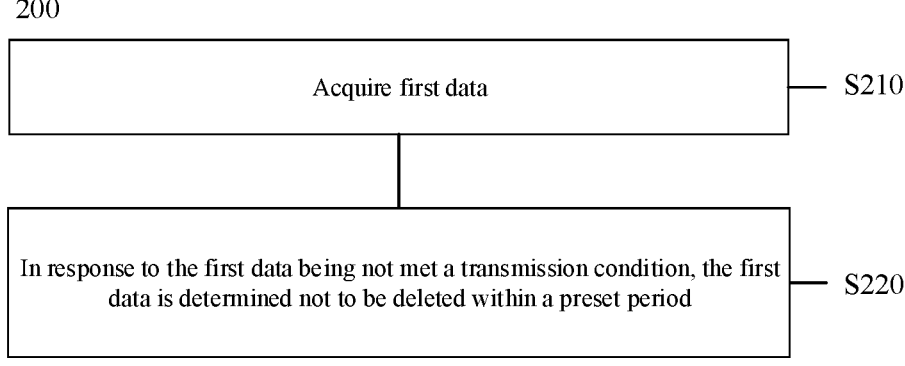
FIG. 2 is a schematic diagram illustrating a communication method provided by the present application.

The communication method provided by the present application is described below. As shown in FIG. 2, the method 200 includes steps described below.

In S210, first data is acquired.

In S220, in response to the first data being not met a transmission condition, the first data is determined not to be deleted within a preset time period.

The method 200 may be executed by a terminal device or a chip in the terminal device. The first data is, for example, MAC PDU. The network device may configure a first hybrid automatic repeat request (HARQ) process for the transmission resource of the first data, so that the terminal device stores the first data in the first HARQ process after the first data is generated.

As an optional way of not deleting the first data, the terminal device may set a flag bit for the buffer of the first HARQ process. The flag bit is, for example, 1 bit. When the flag bit is "0", it indicates that the buffer of the first HARQ process can be emptied; when the flag bit is "1", it indicates that the buffer of the first HARQ process cannot be emptied. If the first data does not meet the transmission condition and the first data is stored in the buffer of the first HARQ process, the terminal device may set the flag bit of the buffer as "1" to save the first data.

As another optional way of not deleting the first data, the terminal device may configure a timer for the first data. During the running of the timer (that is, within a preset time period), the first data is not allowed to be deleted, thereby preventing the first data from being deleted when it does not meet the transmission condition. Situations that the first data does not meet the transmission condition may include: the priority of the first data meeting a priority requirement.

For example, the network device schedules the terminal device to transmit enhanced mobile broadband (eMBB) services on transmission resource 1, then schedules the terminal device to transmit ultra reliability and low latency communication (URLLC) services on transmission resource 2, and the two transmission resources partly overlap. After the terminal device generates the MAC PDU of the two services, it will transmit the MAC PDU of the URLLC service on transmission resource 2 instead of the MAC PDU of the eMBB service, so as to meet the requirements of the URLLC service. The MAC PDU of the eMBB service when the eMBB service and the URLLC service coexist is an example of the first data.

The transmission resource bearing the first data may be a configured grant (CG) resource, and the above timer may be a Configured grant timer. Each HARQ process of the CG resource corresponds to a Configured grant timer. The role of the Configured grant timer lies in: during the running of the Configured grant timer, the data in the HARQ process corresponding to the Configured grant timer cannot be deleted. The network device can also schedule dynamic grant (DG) resources to transmit data. When the network device schedules the DG resource for transmission, it can also use the HARQ process configured for the CG resource. After the terminal device obtains the first data transmitted on the DG resource, it will also start the Configured grant timer. During the running of the Configured grant timer, the data in the HARQ process corresponding to the Configured grant timer cannot be deleted. Therefore, in order to avoid data loss due to deletion of the first data that has not been successfully transmitted, the Configured grant timer may be initiated when the first data does not meet the transmission condition. The first data does not meet the transmission condition in at least one of the following situations:

the transmission resource of the first data overlaps with the transmission resource of the second data;

the first data is stored in the first HARQ process;

the first data has not been transmitted.

In the present application, unless otherwise specified, "first" and "second" are used to distinguish two different individuals and have no other restrictions, for example, the above-mentioned "first data" and "second data" indicate two different individuals.

When the first data is the deprioritized MAC PDU, and/or when the transmission resource of the first data overlaps with the transmission resource of the second data, the terminal device may not transmit the first data on the transmission resource of the first data, or transmit the first data on the transmission resource of the first data. Since the priority of the first data is low, the first data may be punctured by the second data even if it is transmitted, resulting in a decrease in the transmission success rate of the first data. Therefore, the two situations may be deemed by the terminal device as situations where the first data does not meet the transmission conditions.

When the first data is stored in the first HARQ process, and/or when the first data has not been transmitted, the first data may have experienced a failure transmission process. Therefore, the terminal device may also consider such situation as the situation where the first data does not meet the transmission conditions.

When the transmission resource of the first data overlaps with the transmission resource of the second data, if the terminal device has generated the first data and the second data (both stored in the second HARQ process) and the priority of the second data is higher than that of the first data, then the terminal device can store the first data from the second HARQ process into the first HARQ process, and wait for the next retransmission or new transmission or subsequent release.

In the above solution, the first data and the second data are stored in different HARQ processes, which can avoid a problem that the transmission mode of the first data is differently understood by the network device and the terminal device. The terminal device may retransmit the first data later or not in compliance with the network device's decision.

When the transmission resource of the first data overlaps with the transmission resource of the second data, if the terminal device has generated and stored the first data in the first HARQ process, and the priority of the transmission resource of the second data is higher than the priority of the transmission resource of the first data, then the terminal device may not generate the second data; or the terminal device may generate the second data and store the second data in the second HARQ process.

The priority of the transmission resource of the second data may be a resource priority, the priority of the data to be transmitted on the transmission resource, or the priority of a logical channel to be transmitted on the transmission resource, and a manner of dividing the priority of transmission resources is not defined in the embodiments of the present application.

In the above solution, if the terminal device does not generate the second data, the latency of waiting for retransmission is avoided; if the terminal device generates the second data and stores the first data and the second data in different HARQ processes, the problem that the transmission mode of the first data is differently understood by the network device and the terminal device can be avoided, and the terminal device may retransmit the first data in the future or not in compliance with the decision of the network device.

When the transmission resource of the first data overlaps with the transmission resource of the second data, if the terminal device has already generated the first data, and the priority of the transmission resource of the second data is higher than the priority of the transmission resource of the first data, then the terminal device generates the second data, stores the second data in the first HARQ process, and stores the first data in another HARQ process.

The priority of the transmission resource of the second data may be the resource priority, the priority of the data to be transmitted on the transmission resource, or the priority of the logical channel to be transmitted on the transmission resource.

Since the first HARQ process is preferentially transmitted, high-priority services are ensured to be transmitted as soon as possible by storing the second data in the first HARQ process and removing the first data from the HARQ process, thus reducing the latency of the high-priority service.

After determining that the first data does not meet the transmission condition, the terminal device may start or restart the configured grant timer at a first moment, which is the moment before the end time domain position of the transmission resource of the first data.

For example, the first moment is the transmission moment of the first data, where the transmission moment of the first data may be determined by the MAC layer. When the transmission moment of the first data comes, the terminal device starts or restarts the configured grant timer. The transmission moment of the first data may also be the transmission time of the physical uplink shared channel (PUSCH) corresponding to the first data, or the transmission moment of the PUSCH of the first data determined by the MAC layer. When the above moment comes, the terminal device can start or restart the configured grant timer. The PUSCH corresponding to the above first data may be interpreted as: a PUSCH used to transmit the first data or a PUSCH pre-allocated to the first data.

The first moment may also be: the moment when the first data is obtained (for example, the moment when the MAC layer acquires the first data), or the moment when the MAC layer delivers the uplink grant of the first data to the physical layer, or the moment when the MAC layer delivers the first data to the physical layer. When the above moment comes, the terminal device can start or restart the configured grant timer.

Assuming that the first data is generated by the MAC layer of the terminal device, due to some reasons, e.g., the first data is the deprioritized MAC PDU, or the transmission resource of the first data overlaps with other transmission resources, the first data is stored in the first HARQ process, but cannot be transmitted (that is, the PUSCH of the first data cannot be transmitted on the time-frequency positions of the transmission resource through the uplink, or the PUSCH of the first data cannot be transmitted on at least part of the time-frequency positions of the transmission resource through the uplink). In this case, the terminal device can start or restart the configured grant timer at the time of PUSCH transmission or the time when the transmission starts, the time when the PUSCH should be transmitted or the time when the PUSCH should start to transmit.

For example, the configured grant timer is started when the first data is obtained by the MAC layer of the terminal device. If the time interval time between the domain location of the transmission resource of the first data and the moment at which the first data is obtained by the MAC layer is long, the terminal device can restart the configured grant timer when the MAC layer transmits the uplink grant of the first data to the physical layer, and/or restart the configured grant timer at the moment when the MAC layer transmits the first data to the physical layer. In this way, the first data is prevented from being deleted due to timeout of the configured grant timer before the first data is transmitted.

Figure 3:
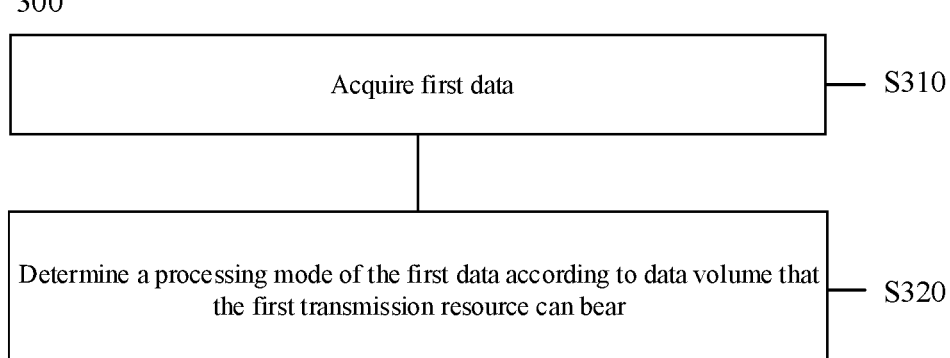
FIG. 3 is a schematic diagram illustrating another communication method provided by the present application.

When the first data does not meet the transmission condition, the first data cannot be transmitted, and the terminal device can attempt to transmit the first data on a new transmission resource based on the method shown in FIG. 3.

As shown in FIG. 3, the method 300 includes steps described below.

In S310, the first data is obtained.

In S320, a processing mode of the first data is determined according to data volume that the first transmission resource can bear.

It should be noted that, in the specification of the present application, even if two methods have the same nouns, the meanings of the nouns in the two methods may be different or the same.

For example, the first data in the method 300 may be the first data in the method 200, or the first data in the method 300 may be different data from the first data in the method 200. The first transmission resource is a new transmission resource used to transmit the first data. The first transmission resource may be a resource determined by the terminal device from a semi-statically configured resource pool, for example, a CG resource. The first transmission resource may also be a resource dynamically scheduled by the network device, for example, a dynamic grant (DG) resource. In particular, the HARQ process of the first transmission resource and the HARQ process of the first data may be either the same or different. When the HARQ process of them is different, the HARQ process of the first transmission resource can also be changed to the HARQ process of the first data, and such change can also be reported to the network device.

Since the first data is deprioritized data, the first transmission resource may be a resource temporarily allocated. Therefore, the data volume that the first transmission resource can bear may not necessarily match the size of the first data. Through determining the processing mode of the first data by the terminal device according to the data volume that the first transmission resource can bear, it can avoid the first data transmission failure occurred when the data volume that the first transmission resource can bear is less than the size of the first data, or can avoid a waste of the first transmission resource when the data volume that the first transmission resource can bear is greater than the size of the first data.

Hereinafter, the processing mode of the first data is described according to the data volume that the first transmission resource can bear.

Case 1: The data volume that the first transmission resource can bear is greater than or equal to the size of the first data.

The terminal device may transmit third data on the first transmission resource, where the third data includes all or part of the information in the first data, and the third data may be a MAC PDU generated by a multiplexing and assembly entity. The transmission of the third data on the first transmission resource may be a new transmission.

For example, when the data volume that the first transmission resource can bear is greater than the size of the first data, the third data contains the first data, and the remaining bits of the third data can be filled with padding; when the data volume that the first transmission resource can bear is equal to the size of the first data, the third data only contains the first data.

For example, the third data includes at least one MAC SDU in the first data, or the third data includes at least one MAC CE in the first data, or the third data includes at least one MAC SDU and at least one MAC CE in the first data. Optionally, the terminal device may compose the at least one MAC SDU into a first MAC sub-PDU, and/or the terminal device can compose the at least one MAC CE into a second MAC sub-PDU.

The third data may further include a third MAC sub-PDU and/or a fourth MAC sub-PDU.

The third MAC sub-PDU and the fourth MAC sub-PDU are MAC sub-PDUs generated in a period between the first transmission resource and the second transmission resource. The third MAC sub-PDU includes a MAC SDU, and the fourth MAC sub-PDU includes a MAC CE. The second transmission resource is a transmission resource anterior to the first transmission resource, and is used to transmit the first data.

The period between the first transmission resource and the second transmission resource may be a period between the first time domain symbol of the second transmission resource and the last time domain symbol of the first transmission resource; or a period between the packetization time of the MAC PDU of the second transmission resource and the packetization time of the MAC PDU of the first transmission resource. The period between the first transmission resource and the second transmission resource may also be a period of other duration.

For example, for the MAC SDU included in the third MAC sub-PDU, the MAC SDU may be data newly generated or obtained by a higher layer of the MAC layer during the period between the first transmission resource and the second transmission resource. For the MAC CE included in the fourth MAC sub-PDU, the MAC CE may be a MAC CE triggered and generated by the MAC layer during the period between the first transmission resource and the second transmission resource, or MAC CE generated when the MAC layer triggers a report, or the MAC CE to be generated when the MAC layer triggers the report, or the MAC CE that can be generated when the MAC layer triggers the report.

The third MAC sub-PDU may be the same as the first MAC sub-PDU or be different with the first MAC sub-PDU; the fourth MAC sub-PDU may be the same as the second MAC sub-PDU or be different with the second MAC sub-PDU.

For example, during the period between the first transmission resource and the second transmission resource, the terminal device triggers a new buffer status report (BSR), that is, the terminal device generates a new BSR MAC CE when it determines that the first transmission resource is available, then the terminal device can discard the old BSR MAC CE (that is, the BSR MAC CE in the first data), and fill the new BSR MAC CE in the third data.

For example, the terminal device triggering a new BSR means that the terminal device triggers a periodic BSR when the periodic BSR reporting condition is met, or the terminal device triggers a regular BSR when data needs to be transmitted exist on a higher priority logical channel.

As another example, during the period between the first transmission resource and the second transmission resource, the terminal device triggers a new BSR, that is, when the terminal device determines that the first transmission resource is available, the terminal device can generate a new BSR MAC CE, discard the old BSR MAC CE (that is, the BSR MAC CE in the first data), and fill the new BSR MAC CE in the third data.

For example, the terminal device triggering a new BSR means that the terminal device triggers a retransmission of the BSR when the condition for retransmitting the BSR report is met. Alternatively, the terminal device can still use the old BSR MAC CE (that is, the BSR MAC CE in the first data) without generating a new BSR MAC CE according to the trigger condition or type of the MAC CE.

As another example, during the period between the first transmission resource and the second transmission resource, the MAC layer of the terminal device obtains a new packet data convergence protocol (PDCP) control PDU (such as a PDCP status report) and/or a new radio link control (RLC) control PDU from a higher layer, then the terminal device can discard the old PDCP control PDU (i.e., the PDCP control PDU in the first data) and the old RLC control PDU (i.e., the RLC control PDU in the first data), and fill the new PDCP control PDU and the new RLC control PDU in the third data.

In the above two examples, the old BSR MAC CE is invalid MAC CE, the new BSR MAC CE is valid MAC CE; the old PDCP control PDU and the old RLC control PDU are invalid MAC SDUs, and the new PDCP control PDU and the new RLC control PDU are valid MAC SDUs. The above solution can avoid the resource waste caused by transmitting invalid information.

As another example, during the period between the first transmission resource and the second transmission resource, the MAC layer of the terminal device obtains a new PDCP data PDU and/or a new RLC data PDU from a higher layer, then the terminal device can generate a new MAC sub-PDU and fill it in the third data when there are vacant resources in the first resource or the priority of the data PDU is high.

When the data volume that the first transmission resource can bear is equal to the size of the first data, that is, when the first transmission resource matches the first data, the terminal device may transmit the third data on the first transmission resource. The third data may include all the information of the first data, or may include partial information of the first data.

As another example, when the data volume that the first transmission resource can bear is greater than the size of the first data, the terminal device may transmit the third data on the first transmission resource, where the third data may contain all the information of the first data, or contain partial information of the first data. If the data volume that the first transmission resource can bear is greater than the size of the third data, the terminal device may add padding to the third data, or the terminal device may use the first transmission resource to transmit other data.

If the data volume that the first transmission resource can bear is greater than the size of the first data, the terminal device may discard the first data and transmit other data, for example, data matching the first transmission resource, to avoid resource waste.

Case 2: The data volume that the first transmission resource can bear is less than the size of the first data.

In Case 2, since the first transmission resource cannot bear the first data, the terminal device cannot transmit the entire content of the first data on the first transmission resource. As a result, the terminal device can choose to discard the first data and use the first transmission resource to transmit data matching the first transmission resource. Alternatively, the terminal device may also delete part of the content of the first data, so that the first transmission resource can bear the first data.

The terminal device may generate fourth data through the multiplexing and assembly entity, and transmit the fourth data on the first transmission resource, where the fourth data includes partial information in the first data, and the transmission of the fourth data on the first transmission resource may be a new transmission.

For example, the fourth data includes at least one MAC SDU of the first data, or the fourth data includes at least one MAC CE of the first data, or the fourth data includes at least one MAC SDU and at least one MAC CE of the first data. Optionally, the terminal device may compose the at least one MAC SDU into a first MAC sub-PDU, and/or the terminal device can compose the at least one MAC CE into a second MAC sub-PDU.

Since only part of the content of the first data can be filled in the fourth data, the terminal device can determine which information among the at least one MAC SDU and at least one MAC CE can be filled in the fourth data according to the priority.

The terminal device may determine the priority of the at least one MAC SDU and at least one MAC CE based on pre-definition, network indication, or UE implementation.

For example, the terminal device can determine the priority of the MAC SDU/MAC CE according to the priority and type of the logical channel and the like.

If the fourth data includes at least one MAC SDU of the first data, the at least one MAC SDU is the first m MAC SDUs, in the MAC SDUs of the first data, arranged in a priority descending order, and m is a positive integer.

For example, the first data includes 3 MAC SDUs, which are MAC SDU1, MAC SDU2, and MAC SDU3 respectively in a priority descending order. If m is equal to 1, the first m MAC SDUs arranged in the priority descending order are MAC SDU1. If m is equal to 2, the first m MAC SDUs arranged in the priority descending order are MAC SDU1 and MAC SDU2. If m is equal to 3, the first m MAC SDUs arranged in the priority descending order are MAC SDU1, MAC SDU2, and MAC SDU3. When the data volume that the first transmission resource can bear is greater than the size of all MAC SDUs of the first data, then the first n MAC CEs arranged in the priority descending order among the MAC CEs of the first data are filled into the fourth data, and n is a positive integer.

If the fourth data includes at least one MAC CE of the first data, the at least one MAC CE is the first p MAC SDUs, in the MAC SDUs of the first data, arranged in a priority descending order, and p is a positive integer.

For example, the first data includes 3 MAC CEs, which are MAC CE 1, MAC CE 2, and MAC CE 3 in a priority descending order. If p is equal to 1, the first p MAC CEs in the priority descending order are MAC CE 1. If p is equal to 2, the first p MAC CEs in the priority descending order are MAC CE 1 and MAC CE 2. If p is equal to 3, the first p MAC CEs in the priority descending order are MAC CE 1, MAC CE 2 and MAC CE 3. When the data volume that the first transmission resource can bear is greater than a total size of all MAC CEs of the first data, the first q MAC SDUs in the priority descending order among the MAC SDUs in the first data are filled into the fourth data, and q is a positive integer.

As another example, the terminal device may not distinguish the type of information in the first data, and fill the first k information in the priority descending order among at least one MAC CE and at least one MAC SDU into the fourth data.

The fourth data may further include a third MAC sub-PDU and/or a fourth MAC sub-PDU.

The third MAC sub-PDU and the fourth MAC sub-PDU are MAC sub-PDUs generated in the period between the first transmission resource and the second transmission resource. The third MAC sub-PDU includes a MAC SDU, and the fourth MAC sub-PDU includes a MAC CE. The second transmission resource is a transmission resource anterior to the first transmission resource, and is used to transmit the first data.

The period between the first transmission resource and the second transmission resource may be a period between the first time domain symbol of the second transmission resource and the last time domain symbol of the first transmission resource; or a period between the packetization time of the MAC PDU of the second transmission resource and the packetization time of the MAC PDU of the first transmission resource. The period between the first transmission resource and the second transmission resource may also be a period of other duration.

For example, for the MAC SDU included in the third MAC sub-PDU (an example of the first MAC SDU), the MAC SDU may be data newly generated by the MAC layer or obtained from a higher layer during the period between the first transmission resource and the second transmission resource. For the MAC CE included in the fourth MAC sub-PDU, the MAC CE may be a MAC CE triggered and generated by the MAC layer during the period between the first transmission resource and the second transmission resource, or MAC CE generated when the MAC layer triggers a report, or the MAC CE to be generated when the MAC layer triggers the report, or the MAC CE that can be generated when the MAC layer triggers the report.

The third MAC sub-PDU may be the same as the first MAC sub-PDU or be different with the first MAC sub-PDU; the fourth MAC sub-PDU may be the same as the second MAC sub-PDU or be different with the second MAC sub-PDU.

For example, during the period between the first transmission resource and the second transmission resource, the terminal device triggers a new BSR (an example of the first MAC CE), that is, the terminal device generates a new BSR MAC CE, then the terminal device may discard the old BSR MAC CE (that is, the BSR MAC CE in the first data) and fill the new BSR MAC CE in the fourth data when it is determined that the first transmission resource is available. The terminal device triggering a new BSR means that, for example, the terminal device triggers a periodic BSR when the periodic BSR reporting condition is met, or the terminal device triggers a regular BSR when data to be transmitted exists on a higher priority logical channel.

As another example, during the period between the first transmission resource and the second transmission resource, the terminal device triggers a new BSR, that is, when the terminal device determines that the first transmission resource is available, the terminal device can generate a new BSR MAC CE, discard the old BSR MAC CE (that is, the BSR MAC CE in the first data), and fill the new BSR MAC CE in the fourth data. For example, the terminal device triggering a new BSR means that the terminal device triggers a retransmission of the BSR when the condition for retransmitting the BSR report is met. Alternatively, the terminal device can still use the old BSR MAC CE (that is, the BSR MAC CE in the first data) without generating a new BSR MAC CE according to the trigger condition or type of the MAC CE.

As another example, during the period between the first transmission resource and the second transmission resource, the MAC layer of the terminal device obtains a new PDCP control PDU (for example, a PDCP status report) and/or a new RLC control PDU from a higher layer, then the terminal device can discard the old PDCP control PDU (that is, the PDCP control PDU in the first data) and the old RLC control PDU (that is, the RLC control PDU in the first data), and fill the new PDCP control PDU and the new RLC control PDU in fourth data.

In the above two examples, the old BSR MAC CE is invalid MAC CE, the new BSR MAC CE is valid MAC CE; the old PDCP control PDU and the old RLC control PDU are invalid MAC SDUs, and the new PDCP control PDU and the new RLC control PDU are valid MAC SDUs. The above solution can avoid the resource waste caused by transmitting invalid information.

As another example, during the period between the first transmission resource and the second transmission resource, the MAC layer of the terminal device obtains a new PDCP data PDU and/or a new RLC data PDU from a higher layer, then the terminal device can generate a new MAC sub-PDU and fill it in the fourth data when there are vacant resources in the first resource or the priority of the data PDU is high.

In method 300, if the HARQ process corresponding to the first data is different from the HARQ process corresponding to the first transmission resource, the terminal device may store part or all of the first data in the HARQ process corresponding to the first transmission resource to save HARQ process resources.

The method 300 describes from the perspective of a terminal device a method for processing deprioritized data provided by the present application. As for the network device, if the network device determines that the terminal device may transmit deprioritized data on a new transmission resource, the network device can determine a detection mode of the deprioritized data according to the method shown in FIG. 4.

As shown in FIG. 4, the method 400 includes step S410.

In S410, a detection mode of first data is determined according to a data volume that a first transmission resource can bear, and the first transmission resource is used to transmit the first data.

The first transmission resource and the first data in the method 400 are the same as the first transmission resource and the first data in the method 300. For the sake of brevity, details are not repeated here.

Since the first data is deprioritized data, the first transmission resource may be a temporarily allocated resource. Accordingly, the data volume that the first transmission resource can bear may not necessarily match the size of the first data.

If the data volume that the first transmission resource can bear is greater than the size of the first data, it means that the terminal device can transmit all the content of the first data, thus the network device can perform detection on the first transmission resource and expect to receive a signal containing all or part of the information of the first data.

If the data volume that the first transmission resource can bear is less than the size of the first data, it means that the terminal device can transmit partial content of the first data, thus the network device can perform detection on the first transmission resource and expect to receive a signal containing part of the information of the first data.

Optionally, the network device may not perform detection on the first transmission resource. For example, according to a preset rule, the terminal device does not transmit the first data on a transmission resource that does not match the first data. Accordingly, the network device can determine not to detect the first data on the first transmission resource according to the preset rule, so as to avoid resource waste.

If the data volume that the first transmission resource can bear is greater than the size of the first data, it means that the terminal device can transmit all the content of the first data, thus the network device can perform detection on the first transmission resource and expect to receive a signal containing all or part of the information of the first data.

The network device executing the method 400 can flexibly determine the detection mode of the deprioritized data according to the actual situation.

Next, two methods for processing deprioritized data provided by the present application are introduced.

As shown in FIG. 5, the network device configures two CG resources for the terminal device, namely CG resource 1 and CG resource 2. CG resource 1 corresponds to HARQ process 1, and CG resource 2 corresponds to HARQ process 3.

The network device activates the CG resource 1 through downlink control information (DCI) 1. Subsequently, the network device schedules a DG resource through DCI 2, and the DG resource overlaps with CG resource 1. The DG resource corresponds to HARQ process 2.

The terminal device determines by executing intra-UE prioritization that data on the DG is preferentially to be transmitted. If the terminal device has generated data to be transmitted on CG resource 1, that is, MAC PDU1, then MAC PDU1 is deprioritized MAC PDU. The terminal device can store MAC PDU1 in a buffer corresponding to HARQ process 1, and store MAC PDU2 (data to be transmitted on the DG resource) in a buffer corresponding to HARQ process 2.

The terminal device preferentially transmits MAC PDU2 and does not transmit MAC PDU1. The terminal device can start or restart the configured grant timer of HARQ process 1 at any time before the time domain end position of the CG resource 1 to prevent MAC PDU1 from being flushed by subsequent buffered data stored in HARQ process 1.

For example, the terminal device can start or restart the configured grant timer at the start time of the CG resource 1.

FIG. 6 shows another processing method of deprioritized data provided by the present application.

The network device configures two CG resources for the terminal device, namely CG resource 1 and CG resource 2. CG resource 1 corresponds to HARQ process 1, and CG resource 2 corresponds to HARQ process 3.

The network device activates CG resource 1 through DCI 1. Subsequently, the network device schedules a DG resource through DCI 2, and the DG resource overlaps with CG resource 1. The DG resource corresponds to HARQ process 2.

The terminal device determines by executing intra-UE prioritization that data on the DG is preferentially to be transmitted. If the terminal device has generated data to be transmitted on CG resource 1, that is, MAC PDU1, then MAC PDU1 is deprioritized MAC PDU. The terminal device can store MAC PDU1 in a buffer corresponding to HARQ process 1, and store MAC PDU2 (data to be transmitted on the DG resource) in a buffer corresponding to HARQ process 2.

The terminal device preferentially transmits MAC PDU2 and does not transmit MAC PDU1. The terminal device can start or restart the configured grant timer of HARQ process 1 at any time before the time domain end position of the CG resource 1, to prevent MAC PDU1 from being flushed by subsequent buffered data stored in HARQ process 1. The terminal device may also not start the configured grant timer of HARQ process 1 or not start the configured grant timer of HARQ process 1 when it is ensured that MAC PDU1 will not be flushed.

Subsequently, the network device can perform dynamic scheduling for HARQ process 1. If the network device schedules the retransmission of MAC PDU1, for example, scheduling the retransmission of MAC PDU1 through a configured scheduling radio network temporary identifier (CS-RNTI), the terminal device transmits MAC PDU1 according to the retransmission. If the network device allocates a new transmission resource to MAC PDU1 (an example of the second transmission resource in the method 300), for example, the network device may schedule a new transmission resource of HARQ process 1 through a physical downlink control channel (PDCCH) scrambled by a cell radio network temporary identifier (C-RNTI), then the terminal device determines the transmission mode of MAC PDU1 according to a transport block size (TBS) of the new transmission resource. The TBS is the data volume that the new transmission resource can bear.

For example, if the TBS of the new transmission resource is 50 bytes and the size of MAC PDU1 is 50 bytes, then the terminal device can rebuild the MAC PDU, and generate MAC PDU3 through the multiplexing and assembly entity. MAC PDU3 contains the MAC SDU and the MAC CE in MAC PDU1. Alternatively, MAC PDU1 is directly used as MAC PDU3 and transmitted. MAC PDU3 is an example of the third data in method 300.

As another example, the TBS of the new transmission resource is 50 bytes, the size of MAC PDU1 is 50 bytes, and MAC PDU1 includes the PDCP status report. Before the start time of the new transmission resource, the terminal device generates a new PDCP status report, then the terminal device can rebulid the MAC PDU, and generate MAC PDU3 through the multiplexing and assembly entity. MAC PDU3 contains the MAC CE and valid MAC SDU in MAC PDU1, and MAC PDU3 does not contain invalid MAC SDU. The valid MAC SDU includes a new PDCP status report, and the invalid MAC SDU includes the PDCP status report in MAC PDU1.

As another example, the TBS of the new transmission resource is 60 bytes and the size of MAC PDU1 is 50 bytes, then the terminal device can rebuild the MAC PDU and generate MAC PDU3 through the multiplexing and assembly entity. MAC PDU3 contains the MAC SDU and MAC CE in MAC PDU1. Further, MAC PDU3 also contains padding information to meet transmission requirements.

As another example, the TBS of the new transmission resource is 60 bytes and the size of MAC PDU1 is 50 bytes, then the terminal device can rebuild the MAC PDU and generate MAC PDU3 through the multiplexing and assembly entity. MAC PDU3 contains the MAC CE and the valid MAC SDU in MAC PDU1, and MAC PDU3 does not contain the invalid MAC SDU. If the size of MAC PDU3 is less than 60 bytes, the terminal device can obtain RLC PDU from higher layer according to logical channel prioritization (LCH) and fill it in MAC PDU3.

As another example, the TBS of the new transmission resource is 60 bytes and the size of MAC PDU1 is 50 bytes, then the terminal device can rebuild the MAC PDU and generate MAC PDU3 through the multiplexing and assembly entity. MAC PDU3 contains the valid MAC CE and the valid MAC SDU in MAC PDU1, and MAC PDU3 does not contain the invalid MAC SDU and the invalid MAC CE. If the size of MAC PDU3 is less than 60 bytes, the terminal device can obtain RLC PDU from higher layer according to LCH and fill it in MAC PDU3.

As another example, if the TBS of the new transmission resource is 40 bytes and the size of MAC PDU1 is 50 bytes, then the terminal device can rebuild the MAC PDU according to the priority of each information in MAC PDU1, and generate MAC PDU3 through the multiplexing and assembly entity. The priority of each information in MAC PDU1 from high to low can be: BSR MAC CE>PDCP control PDU>RLC control PDU>RLC data PDU1>RLC data PDU2>RLC data PDU3. The RLC data PDU1, RLC data PDU2, and RLC data PDU3 represent three different PDUs carrying service data. If a total size of BSR MAC CE, PDCP control PDU, RLC control PDU, RLC data PDU1, and RLC data PDU2 is less than 40 bytes, then the terminal device generates MAC PDU3 containing the above 5 information, and discards RLC data PDU3. Further, when there are scattered resources remaining in the transmission resource, the terminal device may fill padding information in MAC PDU3.

The terminal device can start or restart the configured grant timer of HARQ process 1 after MAC PDU3 is generated, so as to prevent MAC PDU1 from being flushed by subsequent buffered data stored in HARQ process 1. The terminal device may also not start the configured grant timer of HARQ process 1 or not start the configured grant timer of HARQ process 1 when it is ensured that MAC PDU3 will not be flushed.

The method for processing deprioritized data provided by the present application is described above in detail. The above-mentioned method can avoid data loss caused by the deletion of deprioritized MAC PDU. However, for some terminal devices with poor processing capabilities, the above-mentioned communication method is relatively complex. In the following, several other communication methods provided by the present application will be introduced. The following several methods can avoid generating or storing deprioritized data, thereby reducing the burden on the terminal device.

As shown in FIG. 7, the method 700 includes steps described below.

In S710, a first transmission resource is determined, the first transmission resource is used for transmitting the first data.

In S720, the first data is generated.

In S730, a second transmission resource is determined, the second transmission resource is used for transmitting second data, where the first data and the second data correspond to the same HARQ process, and the first transmission resource overlaps with the second transmission resource.

In S740, it is determined not to generate the second data and/or grant information of the second data.

The first transmission resource may be a CG resource or a DG resource. Determining the first transmission resource may be interpreted as: determining, by the terminal device, a CG resource from a semi-statically configured resource pool; or receiving, by the terminal device, an indication information indicating a DG resource from the network device, and determining the DG resource according to the indication information.

The second transmission resource may be a CG resource or a DG resource. Determining the second transmission resource may be interpreted as: determining, by the terminal device, a CG resource from a semi-statically configured resource pool; or receiving, by the terminal device, indication information indicating a DG resource from the network device, and determining the DG resource according to the indication information.

The first transmission resource and the second transmission resource may partially overlap, or may completely overlap. The first data is, for example, a MAC PDU. If the terminal device has already generated the MAC PDU corresponding to the first transmission resource when determining the second transmission resource, regardless of the priority of the second transmission resource, the terminal device may no longer generate the MAC PDU corresponding to the second transmission resource, and also no longer generate grant information for the second transmission resource. The terminal device executing the method 700 does not generate deprioritized data, thereby avoiding the terminal device from executing a complicated deprioritized data processing method.

It should be noted that this method is also applicable to scenarios where resource priorities are equal.

As shown in FIG. 8, the method 800 includes steps described below.

In S810, a first transmission resource is determined, the first transmission resource is used for transmitting first data.

In S820, a second transmission resource is determined, the second transmission resource is used for transmitting second data, where the first data and the second data correspond to the same HARQ process, and the first transmission resource overlaps with the second transmission resource.

In S830, data corresponding to a transmission resource with a higher priority in the first transmission resource and the second transmission resource is generated.

The first transmission resource may be a CG resource or a DG resource. Determining the first transmission resource may be interpreted as: determining, by the terminal device, a CG resource from a semi-statically configured resource pool; or receiving, by the terminal device, indication information indicating a DG resource from the network device, and determining the DG resource according to the indication information.

The second transmission resource may be a CG resource or a DG resource. Determining the second transmission resource may be interpreted as: determining, by the terminal device, a CG resource from a semi-statically configured resource pool; or receiving, by the terminal device, indication information indicating a DG resource from the network device, and determining the DG resource according to the indication information.

The first transmission resource and the second transmission resource may partially overlap, or may completely overlap. Steps S810 and S820 can be performed in parallel or sequentially. The order in which the terminal device performs S810 and S820 is not limited in the present application. If the terminal device has not generated the first data and the second data after determining the first transmission resource and the second transmission resource, the terminal device can determine the transmission resource with the higher priority between the first transmission resource and the second transmission resource, and generate data with respect to the transmission resource with higher priority.

For example, if the priority of the second transmission resource is higher than that of the first transmission resource, the terminal device may generate the second data and no longer generate the first data. In this way, it is possible to prevent the terminal device from executing a complicated processing method for deprioritized data.

As another example, if the priority of the logical channel or data or MAC CE that can be carried on the second transmission resource is higher than the priority of the logical channel or data or MAC CE that can be carried on the first transmission resource, the terminal device may generate the second data, and no longer generate the first data. In this way, it is possible to prevent the terminal device from executing a complicated processing method for deprioritized data.

It should be noted that this method is also applicable to scenarios where resource priorities are equal.

As shown in FIG. 9, the method 900 includes steps described below.

In S910, a first transmission resource is determined, the first transmission resource is used for transmitting the first data.

In S920, the first data is generated.

In S930, a second transmission resource is determined, the second transmission resource is used for transmitting second data, where the first data and the second data correspond to the same HARQ process, the first transmission resource overlaps with the second transmission resource, and the priority of the third transmission resource is higher than the priority of the first transmission resource.

In S940, the second data is generated.

In S950, the first data is deleted.

Optionally, S930~S950 can be replaced with steps below: determining a second transmission resource for transmitting second data, where the first data and the second data correspond to the same HARQ process, the first transmission resource overlaps with the second transmission resource, if the priority of the second transmission resource is higher than the priority of the first transmission resource, then the second data is generated, and the first data is stored in an additional/reserved/specific/any vacant HARQ process.

Optionally, S930~S950 can be replaced with steps below: determining a second transmission resource for transmitting second data, where the first data and the second data correspond to the same HARQ process, the first transmission resource overlaps with the second transmission resource, if the priority of the second transmission resource is equal to or lower than the priority of the first transmission resource, then the second data and/or the grant information of the second data is not generated.

The first transmission resource may be a CG resource or a DG resource. Determining the first transmission resource may be interpreted as: determining, by the terminal device, a CG resource from a semi-statically configured resource pool; or receiving, by the terminal device, an indication information indicating a DG resource from the network device, and determining the DG resource according to the indication information.

The second transmission resource may be a CG resource or a DG resource. Determining the second transmission resource may be interpreted as: determining, by the terminal device, a CG resource from a semi-statically configured resource pool; or receiving, by the terminal device, an indication information indicating a DG resource from the network device, and determining the DG resource according to the indication information.

The first transmission resource and the second transmission resource may partially overlap, or may completely overlap. The first data is, for example, a MAC PDU. If the terminal device has generated a MAC PDU corresponding to the first transmission resource when determining the second transmission resource, and the priority of the second transmission resource is higher than the priority of the first transmission resource, then the terminal device may generate the MAC PDU corresponding to the second transmission resource (that is, the second data) and delete the MAC PDU corresponding to the first transmission resource. S940 and S950 can be performed in parallel or sequentially. The order in which the terminal device performs S940 and S950 is not limited in the present application.

It should be noted that this method is also applicable to scenarios where resource priorities are equal.

The terminal device that executes the method 900 does not generate deprioritized data, thereby preventing the terminal device from executing a complicated processing method for deprioritized data.

Examples of the communication method provided by the present application are described above in detail. It can be understood that a communication device includes hardware structures and/or software modules configured to perform various corresponding functions so as to implement the above-mentioned functions. Those skilled in the art should easily realize that in combination with the units and algorithm steps of the examples described in the embodiments disclosed herein, the present application can be implemented in the form of hardware or a combination of hardware and computer software. Whether a certain function is executed by hardware or computer software-driven hardware depends on the specific application and design constraint conditions of the technical solution. Professionals and technicians can use different methods for each specific application to implement the described functions, but such implementation should not be considered beyond the scope of the present application.

The present application may divide the communication device into functional units according to the foregoing method examples.

For example, each function may be divided into a single functional unit, or two or more functions may be integrated into one processing unit. The above-mentioned integrated unit can be implemented in the form of hardware or software functional unit. It should be noted that the division of units in the application is illustrative, and is only a logical function division, and there may be other division methods in actual implementation.

FIG. 10 is a schematic structural diagram illustrating a communication device provided by the present application, and the dotted line in the figure indicates that the unit is an optional unit. The communication device 1000 includes a processing unit 1010 and a communication unit 1020. The processing unit 1010 can control the communication unit 1020 to perform an acquiring step (or a receiving step). The processing unit 1010 is configured to:

acquire first data; and in response to the first data being not met a transmission condition, determine not to delete the first data within a preset period.

The processing unit 1010 may obtain the first data as follows: the processing unit 1010 may generate the first data by itself, obtain the first data generated by a higher layer through the communication unit 1020, or receive the first data from another device through the communication unit 1020.

Optionally, the processing unit 1010 is further configured to start or restart a timer, and the timer is configured so that the first data is not deleted within the preset period.

Optionally, the first data is stored in a first HARQ process, and the timer is a configured grant timer of the first HARQ process.

Optionally, the processing unit 1010 is further configured to start or restart the timer at a first moment, where the first moment is a moment before the time domain end position on the transmission resource of the first data.

Optionally, the first moment includes one of: a transmission moment of the first data; the moment when the first data is obtained; the moment when the MAC layer delivers the uplink grant of the first data to the physical layer; the moment when the MAC layer delivers the first data to the physical layer.

Optionally, the transmission moment of the first data includes: the transmission moment of the first data determined by the MAC layer.

Optionally, the transmission moment of the first data includes: the transmission moment for transmitting the PUSCH of the first data.

Optionally, the moment when the first data is obtained includes: the moment when the MAC layer obtains the first data.

Optionally, the first data being not met a transmission condition includes: the first data is data that meets a priority requirement.

Optionally, the data that meets the priority requirement includes deprioritized MAC PDU.

Optionally, the first data being not met the transmission condition includes: the transmission resource of the first data overlaps with the transmission resource of the second data.

Optionally, the first data being not met the transmission condition includes: the first data is stored in the first HARQ process.

Optionally, before the first data is stored in the first HARQ process, the first data is stored in a second HARQ process, the second data is stored in the second HARQ process, and the processing unit 1010 is further configured to store the first data in the second HARQ process into the first HARQ process.

FIG. 11 is a schematic structural diagram illustrating a communication device provided by the present application, and the dotted line in the figure indicates that the unit is an optional unit. The device 1100 includes a processing unit 1110 and a communication unit 1120. The processing unit

1110 can control the communication unit 1120 to perform an acquisition step (or, a receiving step). The processing unit 1110 is configured to:

acquire first data; and determine a processing mode of the first data according to data volume that the first transmission resource can bear.

The processing unit 1110 may acquire the first data as follows: the processing unit 1110 may generate the first data by itself, obtain the first data generated by a higher layer through the communication unit 1120, or receive the first data from another device through the communication unit 1120.

Optionally, the processing unit 1110 is further configured to: when the data volume that the first transmission resource can bear is greater than or equal to the size of the first data, transmit third data on the first transmission resource, where the third data includes part or all of the first data.

Optionally, the third data includes at least one of at least one MAC SDU and at least one MAC CE of the first data.

Optionally, the at least one MAC SDU belongs to a first MAC sub-PDU, and the at least one MAC CE belongs to a second MAC sub-PDU.

Optionally, the third data further includes: a MAC sub-PDU containing the first MAC SDU generated in a period between the second transmission resource and the first transmission resource, where the second transmission resource is used for transmitting the first data, and the second transmission resource precedes the first transmission resource.

The first MAC SDU is a newly generated MAC SDU, which is different from that the third data including at least one MAC SDU of the first data. The explanation about the first MAC SDU here is applicable to all the embodiments of the present application.

Optionally, the third data further includes: a MAC sub-PDU containing the first MAC CE generated in a period between the second transmission resource and the first transmission resource, where the second transmission resource is used for transmitting the first data, and the second transmission resource precedes the first transmission resource.

The first MAC CE is a newly generated MAC CE, which is different from that the third data including at least one MAC CE of the first data. The explanation about the first MAC CE here is applicable to all the embodiments of the present application.

Optionally, the third data includes the at least one MAC SDU, and the at least one MAC SDU is a valid MAC SDU.

Optionally, the third data includes the at least one MAC CE, and the at least one MAC CE is a valid MAC CE.

Optionally, the processing unit 1110 is further configured to: when the data volume that the first transmission resource can bear is less than the size of the first data, transmit fourth data on the first transmission resource, where the fourth data includes a part of the first data.

Optionally, the fourth data includes at least one MAC SDU and/or at least one MAC CE of the first data.

Optionally, the at least one MAC SDU belongs to a first MAC sub-PDU, and the at least one MAC CE belongs to a second MAC sub-PDU.

Optionally, the fourth data includes at least one MAC SDU of the first data, and the at least one MAC SDU is the first m MAC SDUs in a priority descending order among the MAC SDUs in the first data, m is a positive integer.

Optionally, the fourth data further includes at least one MAC CE of the first data, and the at least one MAC CE is:

the first n MAC CEs in a priority descending order among the MAC CEs in the first data, n is a positive integer.

Optionally, the fourth data further includes at least one MAC CE of the first data, and the at least one MAC CE is: the first p MAC CEs in a descending order of priority among the MAC CEs in the first data, p is a positive integer.

Optionally, the fourth data further includes at least one MAC SDU of the first data, and the at least one MAC SDU is the first q MAC SDUs in a priority decending order among the MAC SDUs in the first data, q is a positive integer.

Optionally, the fourth data further includes: a MAC sub-PDU containing the first MAC SDU generated in a period between the second transmission resource and the first transmission resource, where the second transmission resource is used for transmitting the first data, and the second transmission resource precedes the first transmission resource.

Optionally, the fourth data further includes: a MAC sub-PDU containing the first MAC CE generated in a period between the second transmission resource and the first transmission resource, where the second transmission resource is used for transmitting the first data, and the second transmission resource precedes the first transmission resource.

Optionally, the fourth data includes the at least one MAC SDU, and the at least one MAC SDU is a valid MAC SDU.

Optionally, the fourth data includes the at least one MAC CE, and the at least one MAC CE is a valid MAC CE.

Optionally, the first data is stored in a first HARQ process, the first transmission resource corresponds to a second HARQ process, and the processing unit 1110 is further configured to: store part or all of the content of the first data in the second HARQ process.

Optionally, the processing unit 1110 is further configured to delete the first data when the data volume that the first transmission resource can bear is greater than or less than the size of the first data.

Figures 12, 13, 14, 15, 16:
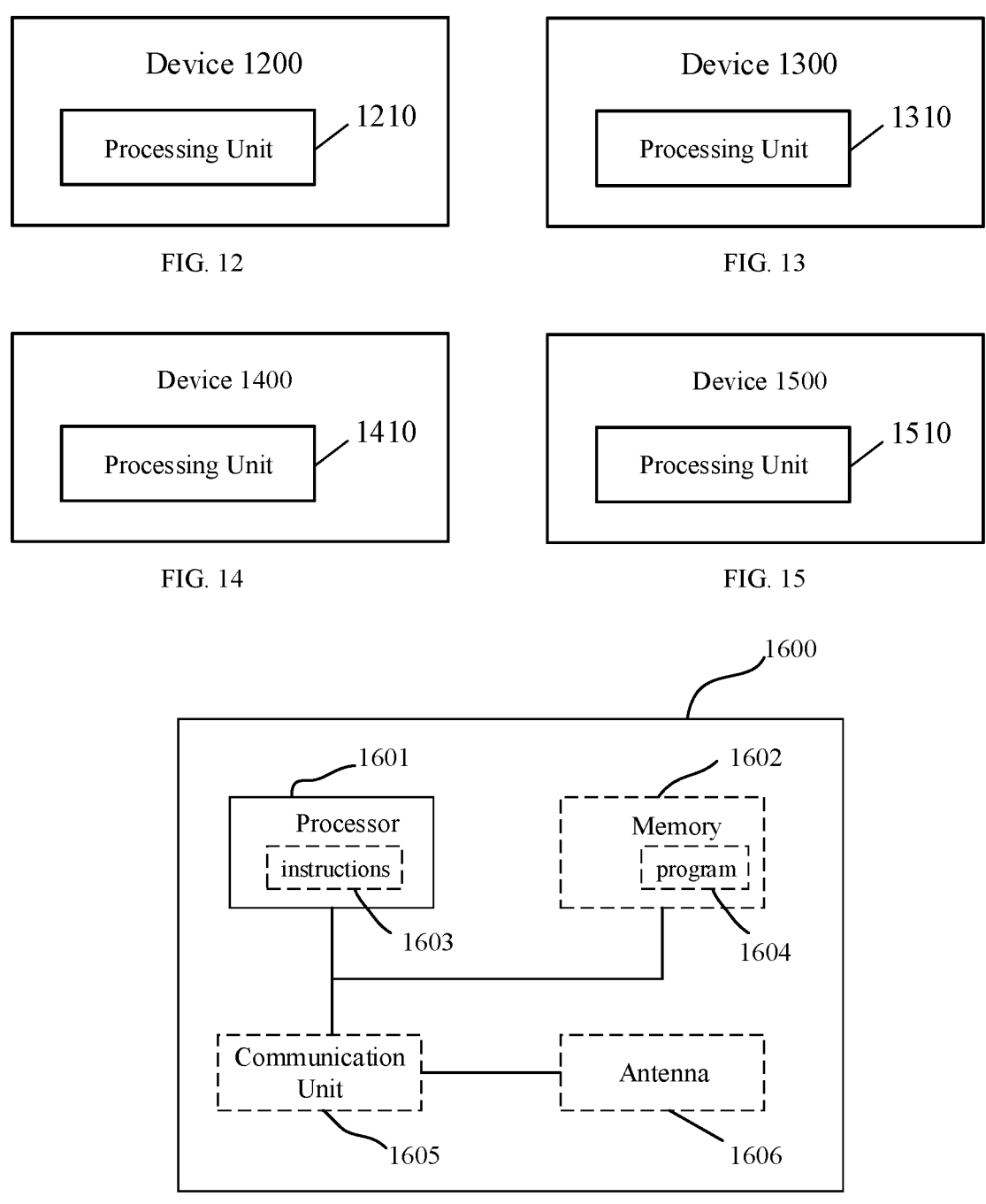
FIG. 12 is a schematic diagram illustrating yet another communication device provided by the present application.
FIG. 13 is a schematic diagram illustrating yet another communication device provided by the present application.
FIG. 14 is a schematic diagram illustrating yet another communication device provided by the present application.
FIG. 15 is a schematic diagram illustrating yet another communication device provided by the present application.
FIG. 16 is a schematic diagram illustrating a communication apparatus provided by the present application.

FIG. 12 is a schematic structural diagram illustrating a communication device provided by the present application. The device 1200 includes a processing unit 1210, and the processing unit 1210 is configured to:

determine a detection mode of first data according to a data volume that a first transmission resource can bear, and the first transmission resource is used for transmitting the first data.

Optionally, the processing unit 1210 is further configured to: when the data volume that the first transmission resource can bear is greater than or equal to the size of the first data, detect the first data on the first transmission resource.

Optionally, the processing unit 1210 is further configured to: when the data volume that the first transmission resource can bear is less than the size of the first data, detect the first data on the first transmission resource.

Optionally, the processing unit 1210 is further configured to: when the data volume that the first transmission resource can bear is greater than or less than the size of the first data, determine not to detect the first data on the first transmission resource.

FIG. 13 is a schematic structural diagram illustrating a communication device provided by the present application. The device 1300 includes a processing unit 1310, and the processing unit 1310 is configured to:

determine a first transmission resource, and the first transmission resource is used for transmitting first data;

generate the first data;

determine a second transmission resource, and the second transmission resource is used for transmitting second data, where the first data and the second data correspond to the same HARQ process, and the first transmission resource overlaps with the second transmission resource; and determine not to generate the second data and/or grant information of the second data.

FIG. 14 is a schematic structural diagram illustrating a communication device provided by the present application. The device 1400 includes a processing unit 1410, and the processing unit 1410 is configured to:

determine a first transmission resource, and the first transmission resource is used for transmitting first data;

determine a second transmission resource, and the second transmission resource is used for transmitting second data, where the first data and the second data correspond to the same HARQ process, and the first transmission resource overlaps with the second transmission resource; and generate data corresponding to a transmission resource with a higher priority in the first transmission resource and the second transmission resource.

FIG. 15 is a schematic structural diagram illustrating a communication device provided by the present application. The device 1500 includes a processing unit 1510, and the processing unit 1510 is configured to:

determine a first transmission resource, and the first transmission resource is used for transmitting first data;

generate the first data;

determine a second transmission resource, and the second transmission resource is used for transmitting second data, where the first data and the second data correspond to the same HARQ process, the first transmission resource overlaps with the second transmission resource, and the priority of the second transmission resource is higher than the priority of the first transmission resource;

generate the second data; and delete the first data.

FIG. 16 is a schematic structural diagram illustrating a communication apparatus provided by the present application. The dotted line in FIG. 16 indicates that the unit or the module is optional. The apparatus 1600 may be used to implement the methods described in the foregoing method embodiments. The apparatus 1600 may be a terminal device or a network device or a chip.

The apparatus 1600 includes one or more processors 1601, and the one or more processors 1601 can support the apparatus 1600 to implement the methods in the method embodiments corresponding to FIGS. 2-9. The processor 1601 may be a general-purpose processor or a dedicated processor.

For example, the processor 1601 may be a central processing unit (CPU). The CPU can be configured to control the apparatus 1600 to execute software programs and process data of the software programs. The apparatus 1600 may further include a communication unit 1605 to implement signal input (reception) and output (transmission).

For example, the apparatus 1600 may be a chip, and the communication unit 1605 may be an input and/or output circuit of the chip, or the communication unit 1605 may be a communication interface of the chip, and the chip may be used as components of a terminal device or a network device or other wireless communication device.

As another example, the apparatus 1600 may be a terminal device or a network device, and the communication unit 1605 may be a transceiver of the terminal device or the network device, or the communication unit 1605 may be a transceiver circuit of the terminal device or the network device.

The apparatus 1600 may include one or more memories 1602 with a program 1604 stored thereon. The program 1604 can be run by the processor 1601 to generate instructions 1603 so that the processor 1601 executes the methods described in the foregoing method embodiments according to the instructions 1603. Optionally, the memory 1602 may also store data. Optionally, the processor 1601 may also read data stored in the memory 1602. The data may be stored at the same storage address as the program 1604, or the data may be stored at a different storage address from the program 1604.

The processor 1601 and the memory 1602 may be provided separately or integrated together, for example, integrated on a single board of a network device or a system on chip (SOC) of a terminal device.

The apparatus 1600 may also include an antenna 1606. The communication unit 1605 is configured to implement the transceiver function of the apparatus 1600 through the antenna 1606.

For the specific manner in which the processor 1601 executes the communication method, reference may be made to the related description in the method embodiment.

It should be understood that each step of the foregoing method embodiment may be completed by a logic circuit in the form of hardware or instructions in the form of software in the processor 1601. The processor 1601 may be a CPU, a digital signal processor (DSP), an application specific integrated circuit (ASIC), a field programmable gate array (FPGA), or other programmable logic devices, for example, discrete gates, transistor logic devices, or discrete hardware components.

This application also provides a computer program product that, when executed by the processor 1601, implements the method described in any method embodiment in this application.

The computer program product may be stored in the memory 1602, for example, as a program 1604. The program 1604 subjects to processing processes such as preprocessing, compilation, assembly, and linking, and is finally converted into an executable object file that can be executed by the processor 1601.

The present application also provides a computer-readable storage medium on which a computer program is stored, and when the computer program is executed by a computer, the method described in any method embodiment in the present application is implemented. The computer program can be a high-level language program or an executable target program.

The computer-readable storage medium is, for example, the memory 1602. The memory 1602 may be a volatile memory or a non-volatile memory, or the memory 1602 may include both a volatile memory and a non-volatile memory. The non-volatile memory can be read-only memory (ROM), programmable ROM (PROM), erasable programmable read-only memory (EPROM), and electrically EPROM (EEPROM) or flash memory. Volatile memory may be random access memory (RAM), which is used as an external cache. By way of exemplary but not restrictive description, many forms of RAM are available, such as static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), synchlink DRAM (SLDRAM)) and direct rambus RAM (DR RAM).

Those skilled in the art can clearly understand that, for the convenience and conciseness of the description, the specific working process and technical effects produced by the above-described devices and apparatus can be referred to the corresponding processes and technical effects in the foregoing method embodiments, which is not repeated here.

In the several embodiments provided in the present application, the provided system, device, and method can be implemented in other ways. For example, some features of the method embodiments described above may be ignored or not implemented. The device embodiments described above are merely illustrative. The division of units is only a logical function division. In actual implementation, there may be other division methods, and multiple units or components may be combined or integrated into another system. In addition, the coupling between the various units or the coupling between the various components may be direct coupling or indirect coupling, and the foregoing coupling includes electrical, mechanical, or other forms of connection.

It should be understood that in the various embodiments of the present application, the value of the sequence number of the above-mentioned processes does not mean the order of execution, and the execution order of each process should be determined by its function and internal logic, and should not constitute any limitation to the embodiments of the present application.

In addition, the terms "system" and "network" herein are generally interchangeable herein. The term "and/or" herein is only used to describe an association relationship between associated objects, which represents that there may be three kinds of relationships.

For example, A and/or B may represent three situations: A exists alone, A and B exist at the same time, and B exists alone. In addition, the character "/" herein generally represents an "or" relationship between pre and post associated objects.

In short, the above embodiments are only preferred embodiments of the technical solutions of the present application, and are not used to limit the protection scope of the present application. Any modification, equivalent replacement, improvement, etc. made within the spirit and principle of the application shall be included in the protection scope of the present application.

What is claimed is:

1. A communication method, applied to a terminal device, comprising:

acquiring first data; and determining a processing mode of the first data according to a transport block size of a first transmission resource, wherein the first transmission resource is a configured grant (CG) resource, wherein determining the processing mode of the first data according to the transport block size of the first transmission resource comprises:

in response to the transport block size of the first transmission resource being equal to a size of the first data, transmitting third data on the first transmission resource, and the third data comprises all of the first data;

wherein the third data comprises at least one MAC control element (CE) of the first data, and wherein the third data further comprises:

a MAC sub-PDU containing a MAC CE generated in a period between a second transmission resource and the first transmission resource, and a MAC sub-PDU containing a first MAC SDU generated in the period between the second transmission resource and the first transmission resource; or the MAC sub-PDU containing the MAC CE generated in the period between the second transmission resource and the first transmission resource, wherein the second transmission resource is used for transmitting the first data, and the second transmission resource precedes the first transmission resource.

2. The method according to claim 1, wherein the third data is media access control (MAC) protocol data unit (PDU).

3. The method according to claim 1, wherein the third data further comprises at least one media access control (MAC) service data unit (SDU) of the first data.

4. The method according to claim 3, wherein the at least one MAC SDU belongs to a first MAC sub-PDU, and the at least one MAC CE belongs to a second MAC sub-PDU.

5. A chip, comprising: a processor, configured to call a computer program from a memory and run the computer program, to cause a device provided with the chip to execute the method according to claim 1.

6. A non-transient computer-readable storage medium for storing a computer program, wherein the computer program causes a computer to execute the method according to claim 1.

7. A terminal device, comprising a processor and a memory, wherein the memory is configured to store a computer program, and the processor is configured to call the computer program stored in the memory and run the computer program, to:

acquire first data; and determine a processing mode of the first data according to a transport block size of a first transmission resource, wherein the first transmission resource is a configured grant (CG) resource, wherein the processor is further configured to:

in response to the transport block size of the first transmission resource being equal to a size of the first data, transmit third data on the first transmission resource, wherein the third data comprises all of the first data;

wherein the third data comprises at least one MAC control element (CE) of the first data, and wherein the third data further comprises:

a MAC sub-PDU containing a MAC CE generated in a period between a second transmission resource and the first transmission resource, and a MAC sub-PDU containing a first MAC SDU generated in the period between the second transmission resource and the first transmission resource; or the MAC sub-PDU containing the MAC CE generated in the period between the second transmission resource and the first transmission resource, wherein the second transmission resource is used for transmitting the first data, and the second transmission resource precedes the first transmission resource.

8. The device according to claim 7, wherein the third data is media access control (MAC) protocol data unit (PDU).

9. The device according to claim 7, wherein the third data further comprises at least one media access control (MAC) service data unit (SDU) of the first data.

10. The device according to claim 9, wherein the at least one MAC SDU belongs to a first MAC sub-PDU, and the at least one MAC CE belongs to a second MAC sub-PDU.

11. A network device, comprising a processor and a memory, wherein the memory is configured to store a computer program, and the processor is configured to call the computer program stored in the memory and run the computer program, to:

determine a detection mode of first data according to a transport block size of first transmission resource, wherein the first transmission resource is used for transmitting the first data, wherein the first transmission resource is a configured grant (CG) resource, wherein the processor is further configured to detect the first data on the first transmission resource in response to the transport block size of the first transmission resource being equal to a size of the first data;

wherein the third data comprises at least one MAC control element (CE) of the first data, and wherein the third data further comprises:

a MAC sub-PDU containing a MAC CE generated in a period between a second transmission resource and the first transmission resource, and a MAC sub-PDU containing a first MAC SDU generated in the period between the second transmission resource and the first transmission resource; or the MAC sub-PDU containing the MAC CE generated in the period between the second transmission resource and the first transmission resource, wherein the second transmission resource is used for transmitting the first data, and the second transmission resource precedes the first transmission resource.

* * * * *